United States Patent
Loce et al.

(10) Patent No.: US 10,242,282 B2
(45) Date of Patent: Mar. 26, 2019

(54) VIDEO REDACTION METHOD AND SYSTEM

(71) Applicant: Conduent Business Services, LLC, Dallas, TX (US)

(72) Inventors: Robert P. Loce, Webster, NY (US); Matthew Adam Shreve, Mountain View, CA (US); Shagan Sah, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/463,388

(22) Filed: Mar. 20, 2017

(65) Prior Publication Data

US 2018/0268240 A1 Sep. 20, 2018

(51) Int. Cl.
| | |
|---|---|
| G06K 9/32 | (2006.01) |
| G06N 7/00 | (2006.01) |
| G06N 3/08 | (2006.01) |
| G06N 3/04 | (2006.01) |
| G11B 27/031 | (2006.01) |
| G06K 9/62 | (2006.01) |
| G06K 9/00 | (2006.01) |
| G06F 21/62 | (2013.01) |
| G06F 17/30 | (2006.01) |
| H04N 5/77 | (2006.01) |

(Continued)

(52) U.S. Cl.
CPC ....... *G06K 9/3241* (2013.01); *G06F 17/3079* (2013.01); *G06F 17/30858* (2013.01); *G06F 21/6254* (2013.01); *G06K 9/00771* (2013.01); *G06K 9/628* (2013.01); *G06N 3/04* (2013.01); *G06N 3/08* (2013.01); *G06N 7/005* (2013.01); *G11B 27/031* (2013.01); *H04N 5/77* (2013.01); *H04N 5/783* (2013.01); *H04N 5/91* (2013.01)

(58) Field of Classification Search
None
See application file for complete search history.

(56) References Cited

U.S. PATENT DOCUMENTS

| | | | |
|---|---|---|---|
| 2007/0030528 A1* | 2/2007 | Quaeler | G06F 17/24 358/453 |
| 2010/0138852 A1* | 6/2010 | Hirsch | G06Q 30/02 725/13 |

(Continued)

OTHER PUBLICATIONS

Ahonen et al., "Face description with local binary patterns: Application to face recognition." IEEE transactions on pattern analysis and machine intelligence 28.12 (2006): 2037-2041.

(Continued)

*Primary Examiner* — Delomia L Gilliard
(74) *Attorney, Agent, or Firm* — Fay Sharpe LLP

(57) ABSTRACT

Disclosed is a method and system for generating redacted video of a scene captured using a video camera and augmenting a manual review process of the redacted video of the scene. According to an exemplary embodiment, a video of the scene is redacted via probability-based analysis to detect and obscure privacy sensitive objects included in the captured video. A manual review process of the generated redacted video is augmented to use the object detection probability to enhance the reviewing video frame rate to expedite the manual review process.

26 Claims, 10 Drawing Sheets

(51) Int. Cl.
*H04N 5/783* (2006.01)
*H04N 5/91* (2006.01)

(56) References Cited

U.S. PATENT DOCUMENTS

| | | | | |
|---|---|---|---|---|
| 2014/0104396 A1* | 4/2014 | Salow | ................ | H04N 21/2743 348/47 |
| 2014/0105573 A1* | 4/2014 | Hanckmann | ....... | G06K 9/00718 386/241 |
| 2015/0117703 A1* | 4/2015 | Peng | ........................ | G06T 11/60 382/103 |
| 2016/0246996 A1* | 8/2016 | Khoo | ....................... | G06F 3/048 |
| 2018/0032845 A1* | 2/2018 | Polak | ................... | G06K 9/6269 |
| 2018/0060653 A1* | 3/2018 | Zhang | ................ | G06K 9/00369 |

OTHER PUBLICATIONS

Bay et al., "Speeded-up robust features (SURF)." Computer vision and image understanding 110.3 (2008): 346-359.
Bishop, Christopher M. "Pattern recognition." Machine Learning 128 (2006): 1-58. Neural Network, SVM, EM, kNN, Decision Trees, Random Forests, Clustering Algorithms.
Chen et al., "Protecting personal identification in video", Protecting Privacy in Video Surveillance, Springer London, 2009, 115-128.
Dalal et al., "Histograms of oriented gradients for human detection." Computer Vision and Pattern Recognition, 2005. CVPR 2005. IEEE Computer Society Conference on. vol. 1. IEEE, 2005.
Everingham et al., "The pascal visual object classes (voc) challenge", International journal of computer vision 88.2 (2010): 303-338.
Harris et al., Chris, and Mike Stephens. "A combined corner and edge detector." Alvey vision conference. vol. 15. No. 50. 1988.
Lowe, David G. "Distinctive image features from scale-invariant keypoints." International journal of computer vision 60.2 (2004): 91-110.
Korshunov et al., "Using warping for privacy protection in video surveillance," Digital Signal Processing (DSP), 2013 18th International Conference on, Fira, 2013, pp. 1-6.
Korshunov et al., "PEViD: Privacy Evaluation Video Dataset at Applications of Digital Image Processing XXXVI", Proceedings of SPIE. vol. 8856, 2013.
Pande et al., "Securing Multimedia Content Using Joint Compression and Encryption," in IEEE MultiMedia, vol. 20, No. 4, pp. 50-61, Oct.-Dec. 2013.
Patel et al., "Image Encryption Using Different Techniques: A Review", International Journal of Emerging Technology and Advanced Engineering, ISSN 2250-2459, vol. 1, Issue 1, Nov. 2011.
Pinheiro et al., "From image-level to pixel-level labeling with convolutional networks." Proceedings of the IEEE Conference on Computer Vision and Pattern Recognition, 2015.
Redmon et al., "You Only Look Once: Unified, Real-Time Object Detection", CVPR 2016.
Schiff et al., "Respectful cameras: detecting visual markers in real-time to address privacy concerns", 2007 IEEE/RSJ International Conference on Intelligent Robots and Systems, San Diego, CA, 2007, pp. 971-978.
Szegedy et al., "Deep neural networks for object detection." Advances in Neural Information Processing Systems. 2013.
Vu et al., "Context-aware CNNs for person head detection", Proceedings of the IEEE International Conference on Computer Vision, 2015.
Wickramasuriya et al., "Privacy protecting data collection in media spaces", Proceedings of the 12th annual ACM international conference on Multimedia, ACM, 2004.

* cited by examiner

VIDEO REDACTION METHOD AND SYSTEM

BACKGROUND

This disclosure relates to image processing methods and systems for generating and reviewing redacted video of a scene. More specifically, this disclosure, and the exemplary embodiments described herein, relates to the generation of redacted video where objects detected within a video are obfuscated or removed based on probability based analysis, and relates to a manual review of the redacted video where a manual review process is augmented to provide a variable playback speed of the redacted video based on the probability-based analysis associated with the detected objects.

With increasing vast collections of surveillance video, body worn cameras and private videos, video redaction technology has become very important and is currently an expensive process. Freedom of Information Act (FOIA) laws require government agencies to release video upon request while it must maintain certain degrees of privacy. Video redaction includes the obfuscation or removal of personal information in videos for privacy protection. Two primary steps in a visual redaction system are localization of object(s) to be redacted and obfuscation or removal of the object. Completely automated detection and obfuscation has too many false negatives (missed redactions) for law enforcement to simply input a requested video and release the output. Existing tools marketed to law enforcement have minimal automation, primarily using manual object tagging by a skilled technician in combination with some automated tracking of the objects. These existing tools involve a manual review of every frame to ensure that the identity of a person or sensitive object is not exposed which is a time consuming and expensive process.

Provided herein are automated methods and systems to generate redacted video and augment a manual review process of the redacted video to increase the efficiency and/or accuracy of the reviewer.

INCORPORATION BY REFERENCE

AHONEN et al., "Face description with local binary patterns: Application to face recognition." IEEE transactions on pattern analysis and machine intelligence 28.12 (2006): 2037-2041;

BAY et al., "Speeded-up robust features (SURF)." Computer vision and image understanding 110.3 (2008): 346-359;

BISHOP, Christopher M. "Pattern recognition." Machine Learning 128 (2006): 1-58. Neural Network, SVM, EM, kNN, Decision Trees, Random Forests, Clustering Algorithms;

CHEN et al., "Protecting personal identification in video", Protecting Privacy in Video Surveillance, Springer London, 2009, 115-128;

DALAL et al., "Histograms of oriented gradients for human detection." Computer Vision and Pattern Recognition, 2005. CVPR 2005. IEEE Computer Society Conference on. Vol. 1. IEEE, 2005;

EVERINGHAM et al., "The pascal visual object classes (voc) challenge", International journal of computer vision 88.2 (2010): 303-338;

HARRIS et al., Chris, and Mike Stephens. "A combined corner and edge detector." Alvey vision conference. Vol. 15. No. 50. 1988;

LOWE, David G. "Distinctive image features from scale-invariant keypoints." International journal of computer vision 60.2 (2004): 91-110;

KORSHUNOV et al., "Using warping for privacy protection in video surveillance," Digital Signal Processing (DSP), 2013 18th International Conference on, Fira, 2013, pp. 1-6;

KORSHUNOV et al., "PEViD: Privacy Evaluation Video Dataset at Applications of Digital Image Processing XXXVI", Proceedings of SPIE. Vol. 8856, 2013;

PANDE et al., "Securing Multimedia Content Using Joint Compression and Encryption," in IEEE MultiMedia, vol. 20, no. 4, pp. 50-61, October-December 2013;

PATEL et al., "Image Encryption Using Different Techniques: A Review", International Journal of Emerging Technology and Advanced Engineering, ISSN 2250-2459, Volume 1, Issue 1, November 2011;

PINHEIRO et al., "From image-level to pixel-level labeling with convolutional networks." Proceedings of the IEEE Conference on Computer Vision and Pattern Recognition. 2015;

REDMON et al., "You Only Look Once: Unified, Real-Time Object Detection", CVPR 2016;

SCHIFF et al., "Respectful cameras: detecting visual markers in real-time to address privacy concerns", 2007 IEEE/RSJ International Conference on Intelligent Robots and Systems, San Diego, Calif., 2007, pp. 971-978;

SZEGEDY et al., "Deep neural networks for object detection." Advances in Neural Information Processing Systems. 2013;

VU et al., "Context-aware CNNs for person head detection", Proceedings of the IEEE International Conference on Computer Vision, 2015; and WICKRAMASURIYA et al., "Privacy protecting data collection in media spaces", Proceedings of the 12th annual ACM international conference on Multimedia, ACM, 2004, are incorporated herein by reference in their entirety.

BRIEF DESCRIPTION

In one embodiment of this disclosure, described is a computer-implemented method of generating a redacted video of a nonredacted video of a scene captured using a video camera and augmenting a manual review process of the redacted video of the scene, the method comprising: a) a video acquisition module acquiring the non redacted video of the scene captured using the video camera, the nonredacted video including a plurality of nonredacted video frames; b) an object detection module detecting one or more objects present in one or more of the plurality of nonredacted video frames, each of the detected objects associated with a predetermined object category to be redacted in the generated redacted video and each of the detected objects associated with a respective object detection probability value indicating a probability the detected object belongs to the associated predetermined object category; c) a redaction module redacting one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and d) a manual review module outputting the redacted video at an adaptively controlled frame rate as a function of the object detection probabilities values associated with the detected one or more objects included in a redacted video frame for manual review.

In another embodiment of this disclosure, described is an image processing system for generating a redacted video of a nonredacted scene captured using a video camera and augmenting a manual review process of the redacted video of the scene, the image processing system comprising: a video acquisition module acquiring the nonredacted video of the scene captured using the video camera, the nonredacted video including a plurality of nonredacted video frames; an object detection module detecting one or more objects present in one or more of the plurality of nonredacted video frames, each of the detected objects associated with a predetermined object category to be redacted in the generated redacted video and each of the detected objects associated with a respective object detection probability value indicating a probability the detected object belongs to the associated predetermined object category; a redaction module redacting one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and a manual review module outputting the redacted video at an adaptively controlled frame rate as a function of the object detection probabilities values associated with the detected one or more objects included in a redacted video frame for manual review.

In still another embodiment of this disclosure, described is an image processing system for generating a redacted video of a nonredacted scene captured using a video camera and augmenting a manual review process of the redacted video of the scene, the image processing system comprising: a video acquisition module acquiring the nonredacted video of the scene captured using the video camera, the nonredacted video including a plurality of nonredacted video frames; an object detection module detecting one or more objects present in one or more of the plurality of nonredacted video frames, each of the detected objects associated with a predetermined object category to be redacted in the generated redacted video; a redaction module redacting one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and a manual review module outputting the redacted video at an adaptively controlled frame rate as a function of one or more of an area of the redacted video frame covered by the detected one or more objects, a size of the detected one or more objects included in the redacted video frame, a number of the one or more objects included in the redacted video frame, an object category of the one or more objects included in the redacted video frame, a motion characteristic of the one or more objects included in the redacted video frame, a scene change detection associated with the redacted video frame and a scene recognition detection associated with the redacted video frame.

DETAILED DESCRIPTION

Figure 1:
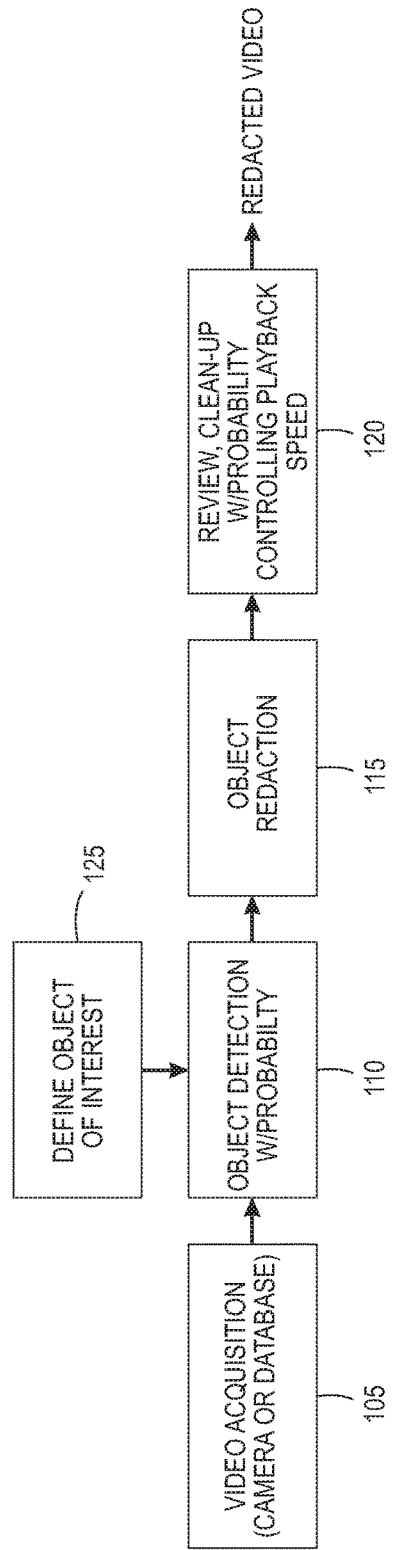
FIG. 1 is a block diagram of a method for generating redacted video of a scene and augmenting a manual review process of the redacted video according to an exemplary embodiment of this disclosure.

This disclosure provides a method and system for augmenting video redaction via probability-based analysis. The method and system can be applied effectively to body worn cameras and/or surveillance videos ranging from near-field/mid-field view to far-field view. According to an exemplary embodiment, the system includes: (1) A Video Acquisition Module configured to acquire video of a scene being surveilled; (2) An Object Detection and Tracking Module configured to detect the presence of an object(s) in the acquired video to be redacted along with an object detection certainty level, such as a probability level or level of confidence, and track the detected object(s) in the entire field of view of a video camera or in pre-determined regions of the scene captured with the video camera. In addition, the Object Detection and Tracking Module can report (on-going) the trajectory of detected object(s); (3) A Redaction Module configured to redact the detected object(s) to remove or obfuscate identifiable personal information associated with the detected object(s); (4) An optional Encryption and Key Generation Tracking Module configured to encrypt the detected object(s) using an encryption key which provides the ability for a user to retrieve the original video in a secured manner; (5) A Video Database Module configured to collect and store the redacted video dataset along with the encryption keys; and (6) A Manual Review Module configured to process probabilities of detected objects to control the video frame rate to expedite a manual review of the redacted video.

The key operations in privacy protection are the detection and obfuscation or removal of detected objects. There have been numerous approaches proposed for these two operations in privacy protection within videos. The most common obscuration methods apply visual transformations on image regions with identity information. These alterations can be as simple as replacing or masking faces with shapes in video frames. See SCHIFF et al., "Respectful cameras: detecting visual markers in real-time to address privacy concerns", 2007 IEEE/RSJ International Conference on Intelligent Robots and Systems, San Diego, Calif., 2007, pp. 971-978. Other common alteration techniques hide objects by blurring, pixilating or interpolating the pixels that make up the object with groups of pixels that are a part of and/or surround the object. More advanced techniques utilize edge and motion models for the entire video to obscure or remove the whole body contour from the video. See CHEN et al. "Protecting personal identification in video", Protecting Privacy in Video Surveillance, Springer London, 2009, 115-128. Some approaches involve scrambling the private part of the image in a way that conceals identity, and can be unscrambled using an encryption key in the possession of authorized viewers. See PANDE et al., "Securing Multimedia Content Using Joint Compression and Encryption," in IEEE MultiMedia, vol. 20, no. 4, pp. 50-61, October-December 2013.

KORSHUNOV et al., "Using warping for privacy protection in video surveillance," Digital Signal Processing (DSP), 2013 18th International Conference on, Fira, 2013, pp. 1-6, shows the use of image warping on faces for detection and recognition. Although some studies have also shown the use of RFID tags for pinpointing the location of people in space (see WICKRAMASURIYA et al., "Privacy protecting data collection in media spaces", Proceedings of the 12th annual ACM international conference on Multimedia, ACM, 2004), most studies rely on a computer vision detector and a tracker algorithm to localize an object in a video frame.

For the purpose of evaluating object detection algorithms, the most popular dataset is the PASCAL Visual Object Classes (VOC) dataset that contains images annotated (object bounding box) with 20 object categories. See EVERINGHAM et al., "The PASCAL Visual Object Classes (VOC) Challenge", International journal of computer vision 88.2 (2010): 303-338. More recent larger datasets include MSCOCO, ImageNet and Annotated Facial Landmarks in the Wild (AFLW) which is a dataset with face annotations. In addition, there are other video datasets like VIRAT that annotate vehicles and pedestrians on roads and video dataset PEViD which was designed with privacy issues in mind. See KOROSHUNOV et al., "PEViD: Privacy Evaluation Video Dataset at Applications of Digital Image Processing XXXVI", Proceedings of SPIE. Vol. 8856, 2013.

Figure 2:
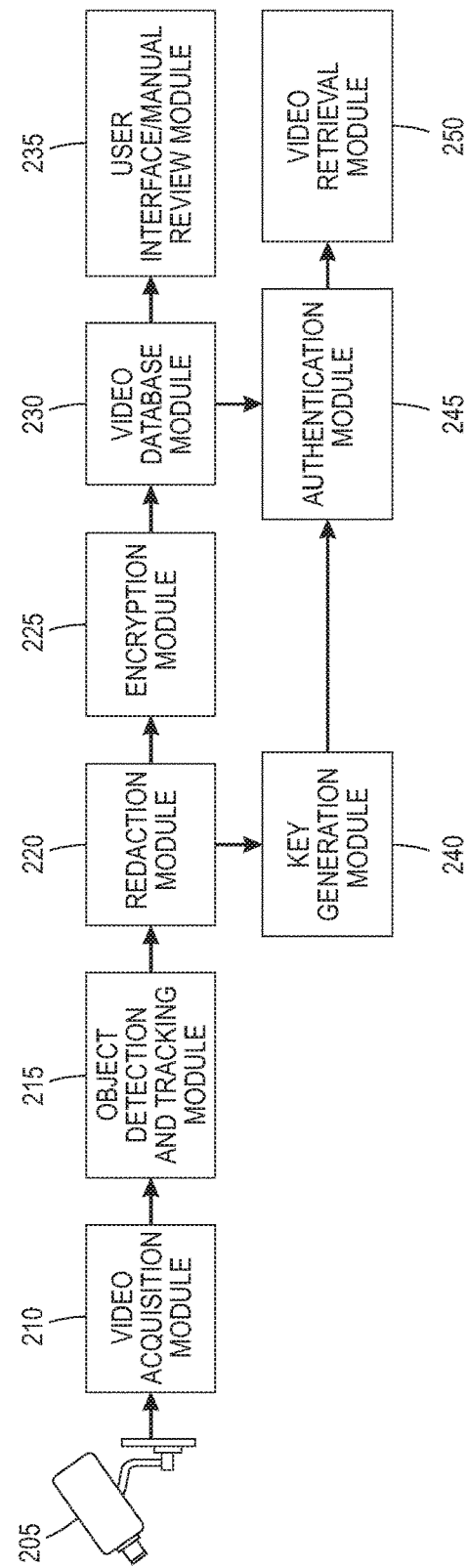
FIG. 2 is a block diagram of a system for generating redacted video of a scene and augmenting a manual review process of the redacted video according to an exemplary embodiment of this disclosure.

With reference to FIGS. 1 and 2, the present disclosure provides a method and system for detecting and redacting potential privacy information included in a video. When supplied with a list of objects with identifiable personal information, the method and system can be applied effectively to body worn camera videos and/or surveillance videos ranging from near-field, mid-field view, to far-field view, including, but not limited to, law enforcement vehicle cameras, fixed traffic cameras, security cameras, etc.

FIG. 1 is a block diagram of a method for generating redacted video of a scene and augmenting a manual review process of the redacted video according to an exemplary embodiment of this disclosure. The method includes a video acquisition module acquiring 105 the nonredacted video of the scene captured using the video camera, the nonredacted video including a plurality of nonredacted video frames; an object detection module detecting 110 one or more objects present in one or more of the plurality of non redacted video frames, each of the detected objects associated with a predetermined object category 125 to be redacted in the generated redacted video and each of the detected objects associated with a respective object detection probability value indicating a probability the detected object belongs to the associated predetermined object category; a redaction module redacting 115 one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and a manual review module outputting 120 the redacted video at an adaptively controlled frame rate as a function of the object detection probabilities values associated with the detected one or more objects included in a redacted video frame for manual review.

FIG. 2 is a block diagram of a system for generating redacted video of a scene and augmenting a manual review process of the redacted video according to an exemplary embodiment of this disclosure. In addition to performing the method described with reference to FIG. 1, the exemplary system of FIG. 2 includes object tracking and encryption features to enhance the overall performance of a video redaction and reviewing system as described and claimed herein. Moreover, it is to be understood that these further enhancements are not intended to limit the scope of the claims. The video redaction system, as shown in FIG. 2, includes:

A Video Acquisition Module 210 configured to acquire video of a scene being surveilled from a camera(s) 205;

An Object Detection and Tracking Module 215 configured to detect the presence of an object(s) to be redacted with a probability or level of confidence, tracking the detected object in the entire field of view or in pre-determined regions in the scene, and reporting (on-going) the trajectory of tracked object(s);

A Redaction Module 220 configured to obfuscate or remove the object(s) to remove identifiable personal information and generate a redacted video;

An optional Encryption 225 and Key Generation Module 240 configured to encrypt the detected object(s) using an encryption using image an encryption technique where a key enables the retrieval of the original video;

A Video Database Module 230 configured to collect and store the redacted video dataset along with the encryption keys; and A Manual Review Module 235 configured to use the object detection probabilities to enhance the video frame rate to expedite the review.

Further details of the exemplary modules and associated processes are now described.

Video Acquisition Module 210

Figure 3:
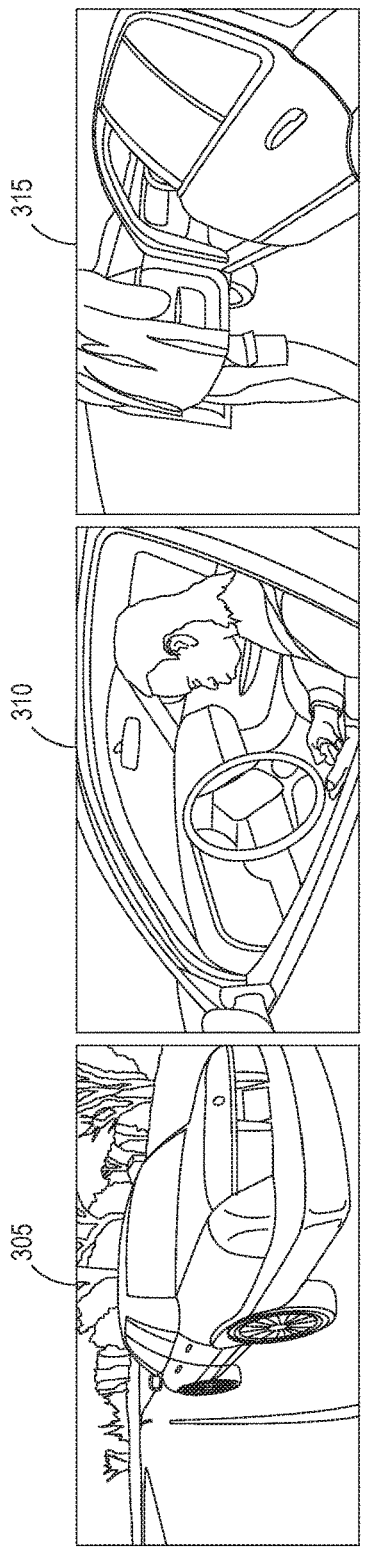
FIG. 3 is an example line drawing representation of a series of video frames captured by a body worn camera on a law enforcement officer during a traffic stop.

This module includes a video camera 205 that acquires video of a scene being surveilled. The videos can be from body worn, surveillance, police vehicle cameras or other sources. In some applications, video acquisition can be from other sources, such as through videos posted over social media. Video acquisition can be from an initial capture device such as a camera or extracted from a database. The camera does not need to be specialized and can be a typical visible video surveillance camera operating at conventional frame rates and resolution, such as but not limited to, frames rates including 15, 30 or 60 frames/sec and resolutions including 1920×1080, 1280×1024, 1280×720, 1280×960, 1280×1024, 2048×1536 pixels. The acquired videos are streamed or archived and analyzed by the disclosed system to detect privacy revealing objects, redacting the identity revealing content, and expediting the manual review process. FIG. 3 is an example of a series of video frames captured by a body worn camera on a law enforcement officer during a traffic stop (face intentionally blurred to protect privacy). Frame 305 includes an image of an initial traffic stop, frame 310 includes an image of a driver as the officer approaches the stopped vehicle, and frame 315 includes an image of the driver exiting the vehicle.

Object Detection and Tracking Module 215

Object detection according to the exemplary embodiments described herein include both the detection and localization of an object or objects of interest within an image. The objects of interest are defined by a user ahead of time and can include faces, heads, bodies, license plates, house numbers, skin, tattoos, logos, street signs, storefront signs, etc. Computer vision techniques for object detection and localization can be used on still images (e.g., single video frames) and then extended to the entire video. This module detects the presence of object(s) that reveal identity information, tracks the detected object(s) in the entire field of view or in pre-determined regions in the scene, and reports the (on-going) trajectory (or trajectories) of the tracked object(s). Generally speaking, an object detection algorithm can have two different type of geometric modes with corresponding outputs, either (a) a rectangular bounding box (or general shape such as an ellipse or circle) around the object, or (b) a pixel-level segmentation of object(s) with its surroundings.

While the exemplary embodiments described herein detect and track an object for redaction, it is to be understood the methods and systems can also be used in an inverse manner where objects detected and tracked are preserved and other regions of the video are redacted.

In the first case (a), the output of an object detection algorithm is a bounding box around the object(s) of interest. One approach to find the bounding box is by using a sliding window approach and detecting the presence of object(s) within the windowed region. However, this approach is very computationally expensive as the number of windows can be very large in order to detect objects at multiple scales and sizes. Alternatively, object detection can be limited to specific predetermined category-independent regions. The predetermined regions are pre-computed based on statistical measurements calculated from features such as, but not limited to, shape, size, color, and texture within the image. Detection performance within a window depends on the representation of the object in a feature space (e.g., Deep features, Harris Corners, SIFT, SURF, HOG, LBP, etc.). See AHONEN et al., "Face description with local binary patterns: Application to face recognition", IEEE transactions on pattern analysis and machine intelligence 28.12 (2006): 2037-2041; BAY et al., "Speeded-up robust features (SURF)." Computer vision and image understanding 110.3 (2008): 346-359; DALAL et al., "Histograms of oriented gradients for human detection", Computer Vision and Pattern Recognition, 2005. CVPR 2005. IEEE Computer Society Conference on. Vol. 1. IEEE, 2005; HARRIS et al., "A combined corner and edge detector", Alvey vision conference. Vol. 15. No. 50. 1988; LOWE, David G., "Distinctive image features from scale-invariant keypoints", International journal of computer vision 60.2 (2004): 91-110; PINHEIRO et al., "From image-level to pixel-level labeling with convolutional networks", Proceedings of the IEEE Conference on Computer Vision and Pattern Recognition. 2015; and SZEGEDY et al., "Deep neural networks for object detection", Advances in Neural Information Processing Systems, 2013.

A classifier (e.g., Neural Net, SVM, EM, k-NN, decision trees, random forests, clustering algorithms, etc.) trained on the available sample feature representations is then applied to features extracted and outputs the parameters of the bounding boxes (e.g., location, width and height) surrounding the matching candidates. See BISHOP, Christopher M. "Pattern recognition." Machine Learning 128 (2006): 1-58. Neural Network, SVM, EM, kNN, Decision Trees, Random Forests, Clustering Algorithms. A classifier such as a support vector machine or neural network can also yield a confidence score or probability for its detection. In another approach, a deep-network can be co-optimized to both detect (classify object) and localize (provide bounding box) objects in an image in a single pass through a network (e.g., YOLO). See REDMON et al., "You Only Look Once: Unified, Real-Time Object Detection", CVPR 2016.

In the second case (b), the output of an object detection algorithm is inferred at a finer scale, i.e., pixel level. See PINHEIRO et al., "From image-level to pixel-level labeling with convolutional networks." Proceedings of the IEEE Conference on Computer Vision and Pattern Recognition, 2015. Although similar learning-based algorithmic techniques as described above can be used, the output is a semantically segmented image. Each pixel in the output is labeled with a class of its enclosing object or region. Notably, when using this approach in the disclosed system, a bounding box can be inferred from the groups of pixels representing the object(s) of interest using clustering techniques, e.g., connected component analysis.

In addition to object detection, tracking of a detected object can be performed on a frame-by-frame basis across the full field of view, i.e., matching consecutive detections of an object as belonging to a single object. One approach that can be used includes tracking by detection, where the distance between multiple detections of the same object are used to assign each object detection to a single track (e.g., the Hungarian method). It is also possible to fuse the output of multiple detection techniques, including those that are based on foreground-background segmentation. One example approach is using temporal differencing, which subtracts frames located nearby in time (e.g., 1-3 frames); alternatively, background subtraction, which requires the estimation of the stationary scene background, followed by subtraction of the estimated background from the current frame to detect foreground objects which includes objects in motion. The output of either approach is a binary mask with pixel dimensions equivalent to the input video with pixel values equal to 0 where no motion/foreground objects are detected and pixel values equal to 1 at pixel locations where motion/foreground objects are detected. This detection mask can be post-processed via morphological operations which discard detected objects with size and orientation outside pre-determined ranges determined by the geometry of the captured image. Examples of other trackers include template-based tracking by detection, Kanade-Lucas-Tomasi (KLT), mean-shift, particle filter, the Circulant Shift Kernel (CSK), and adaptive color attributes trackers. In addition to or as an alternative to tracking objects, a linear prediction filter can be used to interpolate between frames including a common detected object to associate a region of a video frame with the common detected object. For example, a Kalman filter can be used to estimate the location of the bounding box based on prior or future object detections.

In an alternative embodiment, an initial detection in a sequence of video frames can be performed manually by a user selecting an image region or regions. In subsequent frames tracking is performed to maintain a detected bounding box around the subject or subjects of interest.

As an alternative to object tracking using bounding boxes, a per-pixel tracking method can also be used. According to an exemplary embodiment, a dense-motion estimation technique such as optical flow can be used to find correspondences between pixels identified as belonging to an object or objects in the image to fill in missed object detections, especially if a pixel-level object detection method is used (see case b above).

According to another exemplary embodiment of the system, a deep convolutional neural network is trained to detect each object(s) bounding boxes as a regression problem on a frame-by-frame basis. The output of this module is a set of coordinates, one for each detected object, each describing the location of each of the object within each frame of the video along with a probability score. A threshold on the probability score can be used to control the balance between false positive and false negative detection and subsequent redactions. The threshold value depends on the choice of the object detector, complexity in the video and the desired redaction application. This would also vary the time required for manual review. For example, a threshold of 0.7 will yield lower false negatives and false positives but increase the review time. Therefore, an optimal value may be selected while using the redaction system.

Redaction Module 220

After all object(s) with personal identity information are detected, the video is redacted by obfuscating or removing the detected objects to protect privacy. Common techniques to obfuscate include visual transformations of image regions with identity information. The alterations produced by the visual transformations can be as simple as replacing or masking faces with shapes in the video frames. Other common alterations include hiding objects by blurring, and pixilation or interpolation with the surrounding pixels. According to the exemplary embodiment described herein, Gaussian blurring is used to obfuscate personal identity information.

Encryption and Key Generation Module 225, 240

For some applications it may be important to retrieve the original raw (un-redacted) video. For instance, it may be necessary to store videos in a nonredacted and/or redacted form in a database, such that privacy is preserved among persons accessing the database. For this scenario, a decryption key can be used by authorized individuals to extract the original nonredacted and/or redacted video. The original nonredacted video may be needed where the video is required as evidence by a court of law. For this scenario, the system acquires the nonredacted video and encrypts the regions of the video that contain the object(s) of interest by manipulating the relevant pixels values so that the appearance of each object is no longer recognizable. The original nonredacted video can be recovered through the use of the secured decryption key. Example encryptions/decryptions include, but are not limited to, geometric distortions such as pixel shuffles, geometric warping, and the like. Other image encryption techniques include Block-Based Transformations, Hash Functions, The Advanced Hill Cipher Algorithm, Affine Transform and XOR Operation and Differential Evolution Approach In Frequency Domain. See PATEL et al., "Image Encryption Using Different Techniques: A Review", International Journal of Emerging Technology and Advanced Engineering, ISSN 2250-2459, Volume 1, Issue 1, November 2011. The encryption/decryption key can be stored in the database along with the redacted video allowing access only to authorized personnel.

Video Database Module 230

When it is necessary to store videos in a redacted form in a database, after all the processing steps, this module collects and populates a video database along with any metadata. The metadata can include, but is not limited to, video tags that help in retrieval and encryption keys. The video database can be configured to be searched on particular events or time stamps and can also generate statistical summaries.

Manual Review Module 232

An important aspect of any video redaction system is being 100% accurate in detecting all instances of the object(s) in a video. Less-than-perfect segmentation of the object(s), even in a single video frame, may expose a person's identity and violate required privacy protection laws/regulations/standards. Various techniques for object detection often perform at a less than perfect level of accuracy, however object detection can be biased towards false alarms to help ensure that the number of missed object detections is minimized. Moreover, an object tracking algorithm can be used to fill-in the false negatives or gaps between detections to improve the performance of the system. However, to comply with legal requirements, manual reviewing of redacted video is still required to ensure privacy protection.

The manual review process is the most time consuming and expensive steps in a redaction process. Currently, a skilled technician is needed to visually inspect the entire video on a frame-by-frame basis. This is commonly done through a user interface that allows the technician to view each frame. Manual reviewing of video is presently highly inefficient as large parts of the video may not have any privacy related object(s). To improve the speed of this process, a video segment can be fast-forwarded during the review if the technician observes that there are no object(s) with privacy information in that video segment. The ability of the technician to speed up the process depends on the ease of operability of the user interface and the controls provided to the technician. Moreover, manually varying the video rate can be very complicated depending on the video and is highly susceptible to human induced errors. The exemplary video redaction system described herein augments the manual review process by automatically varying the video frame rate of a video being reviewed. Specifically, the probability score of object(s) detection per frame is used to adaptively control the video frame rate of a redacted video being manually reviewed.

To obtain a confidence level of an object classifier, the object classifier is trained under a cross entropy loss that has the form:

$$L_i = -\log\left(\frac{e^{f_i}}{\sum_j e^{f_j}}\right)$$

where $L_i$ is the loss and $f_i$ is i-th element of the vector of class scores f. The function within the brackets is the Softmax function that converts real-values scores to a vector of values between 0 and 1 that sum to 1. The Softmax function represents the probability that a classifier assigns the correct label i (e.g., face, head), given an image region. A Softmax classifier interprets the detection scores f as the unnormalized Log probabilities. Exponentiating the scores yields unnormalized probabilities, and the division performs the normalization so that the probabilities sum to one. Therefore, minimizing the negative log likelihood of the correct class is similar to performing Maximum Likelihood Estimation (MLE). The probability score is interpreted as a confidence the classifier has in making a decision about a detected object's class or category, such as categories associated with preserving privacy including, but not limited to, faces, license plates, tattoos, house address identifiers, computer screens, street signs, logos, body parts, etc.

Probability scores are obtained while detecting the object(s) in each of the frames of the nonredacted video. The probability curves over time can have high frequency spikes due to varying performance of the object detector. Therefore, smoothing methods can be applied to the probability scores depending on the time-scale used and/or performance/characteristics of the object detector. According to an exemplary embodiment described herein, the object detector is configured to use a second degree polynomial approximation over a 2-7 frames window before and after the video frame of interest. Alternative smoothing methods include, but are not limited to, convolution, curve fitting, moving average, etc.

A multi-level predetermined thresholding approach is applied to obtain the resulting video frame rates which adaptively control the playback speed of the redacted video, and a variable frame rate video is constructed for the manual review based on the probability windows. For video segments where the detection probability is high, i.e., the detector is highly confident that its output detection bounding box contains the object of interest, and for video segments where the probability is very low, i.e., the detector is confident that no instance of the object(s) is present, the video playback frame rate is adaptively increased. By increasing the playback speed for these instances, the overall time a technician needs to inspect the frames is reduced. For video segments where the object detector is not very confident, the video frame rate is decreased to allow the technician more time to carefully review the video frames. This approach is most efficient with videos with long segments that contain easily detectable object(s), no instance of object(s), or a combination of both. The decreasing of the playback video frame rate of the less confident segments ensures an improved overall performance in privacy protection. It is also observed that the division thresholds depend on the object detection method and characteristics of the test video.

Figure 4:
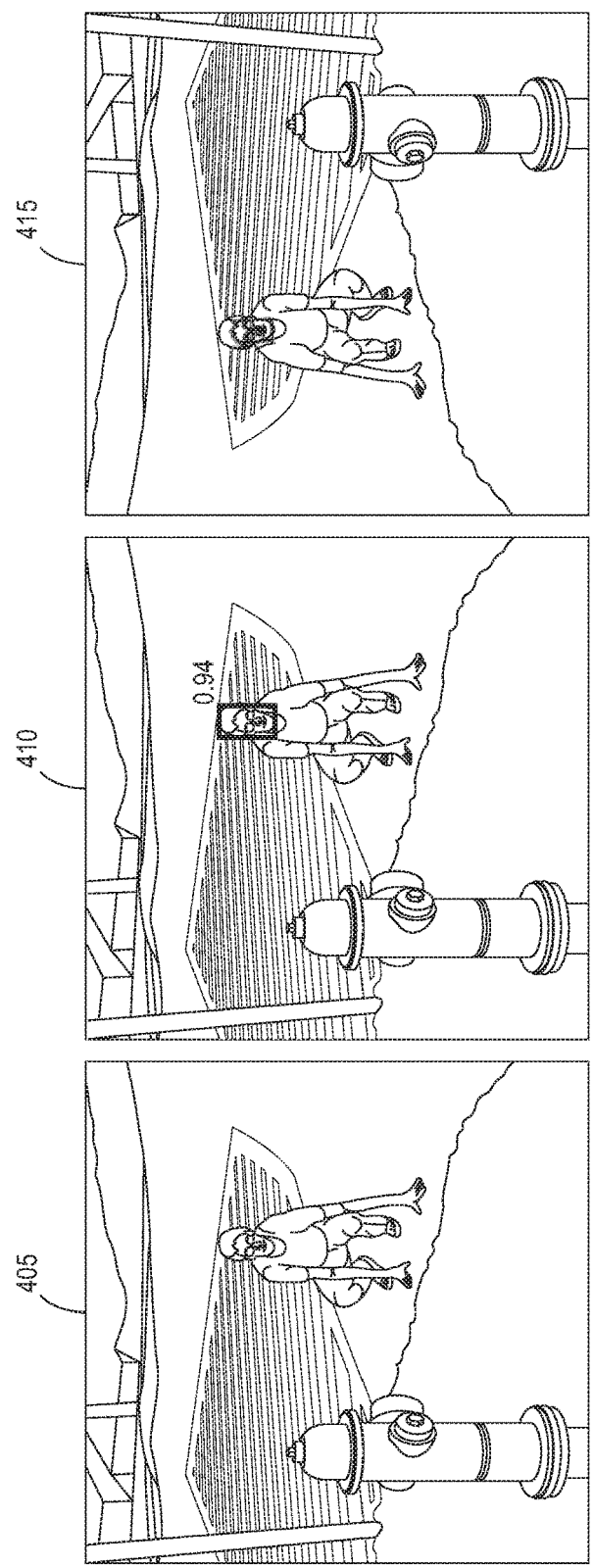
FIG. 4 is a line drawing representation of a set of video frames including an originally captured video frame 405 of a scene, a processed video frame 410 identifying a face within a box with a 0.94 face detection probability (High); and a further processed video frame 415 redacting the originally captured video frame to include a blurred face identified in processed video frame 410 where a relatively fast video playback speed is provided to a manual review process of the redacted video and the processed video frames 410 and 415 generated according to an exemplary embodiment of this disclosure.

FIG. 4 is a line drawing representation of a set of video frames including an originally captured video frame 405 of a scene, a processed video frame 410 identifying a face within a box with a 0.94 face detecting probability (High); and a further processed redacted video frame 415 of the originally captured video frame including a blurred face identified in processed video frame 410. A relatively fast video playback speed is provided to a manual review process of redacted video frame 415 generated according to an exemplary embodiment of this disclosure.

Figure 5:
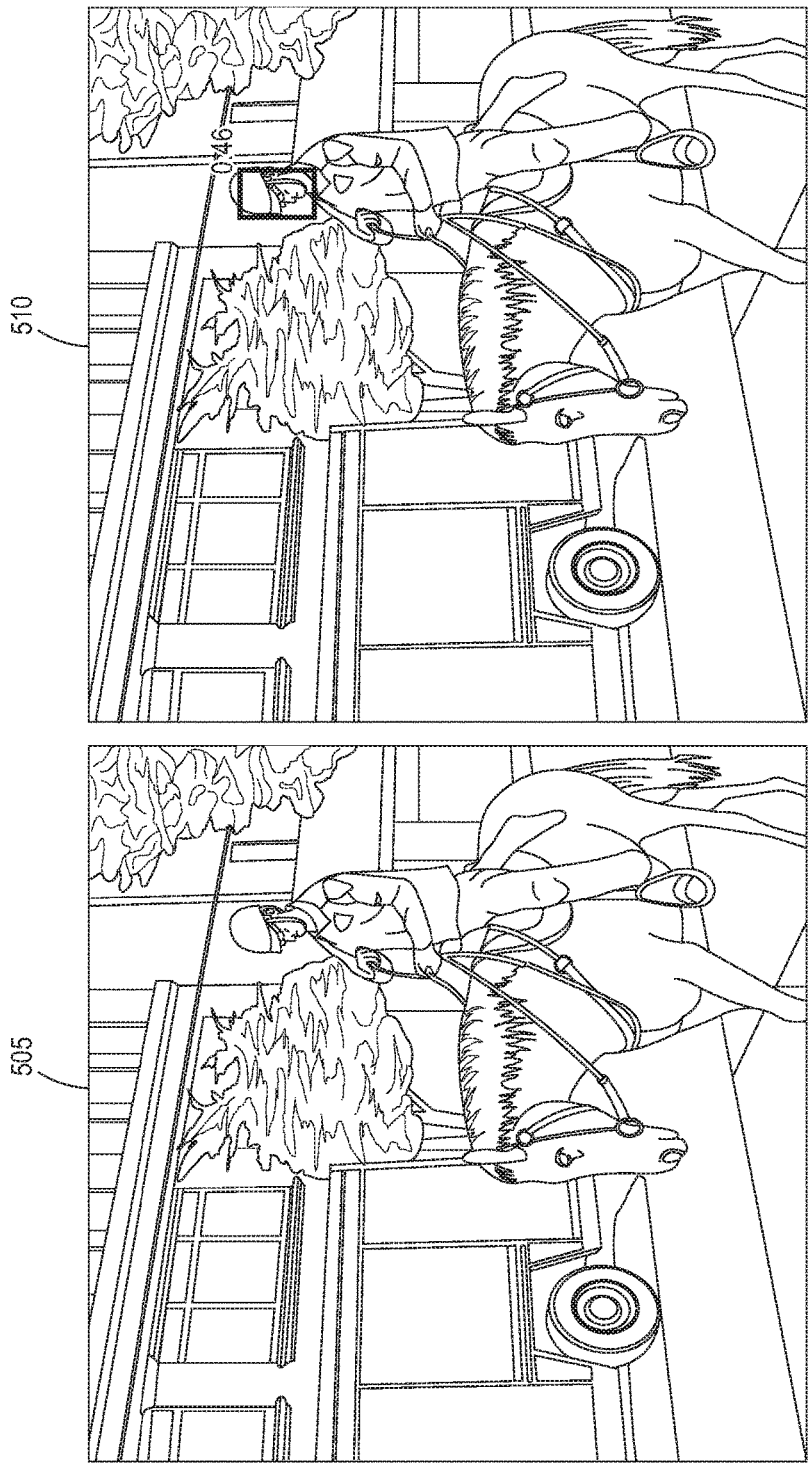
FIG. 5 is another set of line drawing representations of video frames including an originally captured video frame 505 of a scene and a processed video frame 510 identifying a face within a box with a 0.46 face detection probability (Mid-Level) according to an exemplary embodiment of this disclosure where a relatively slow playback speed is provided to a manual review process of the redacted video.

FIG. 5 is a line drawing representation of another set of video frames including an originally captured video frame 505 of a scene and a processed video frame 510 identifying a face within a box with a 0.46 face detection probability (Mid-Level) according to an exemplary embodiment of this disclosure where a relatively slow playback speed is provided to a manual review process of the redacted video.

Figure 6:
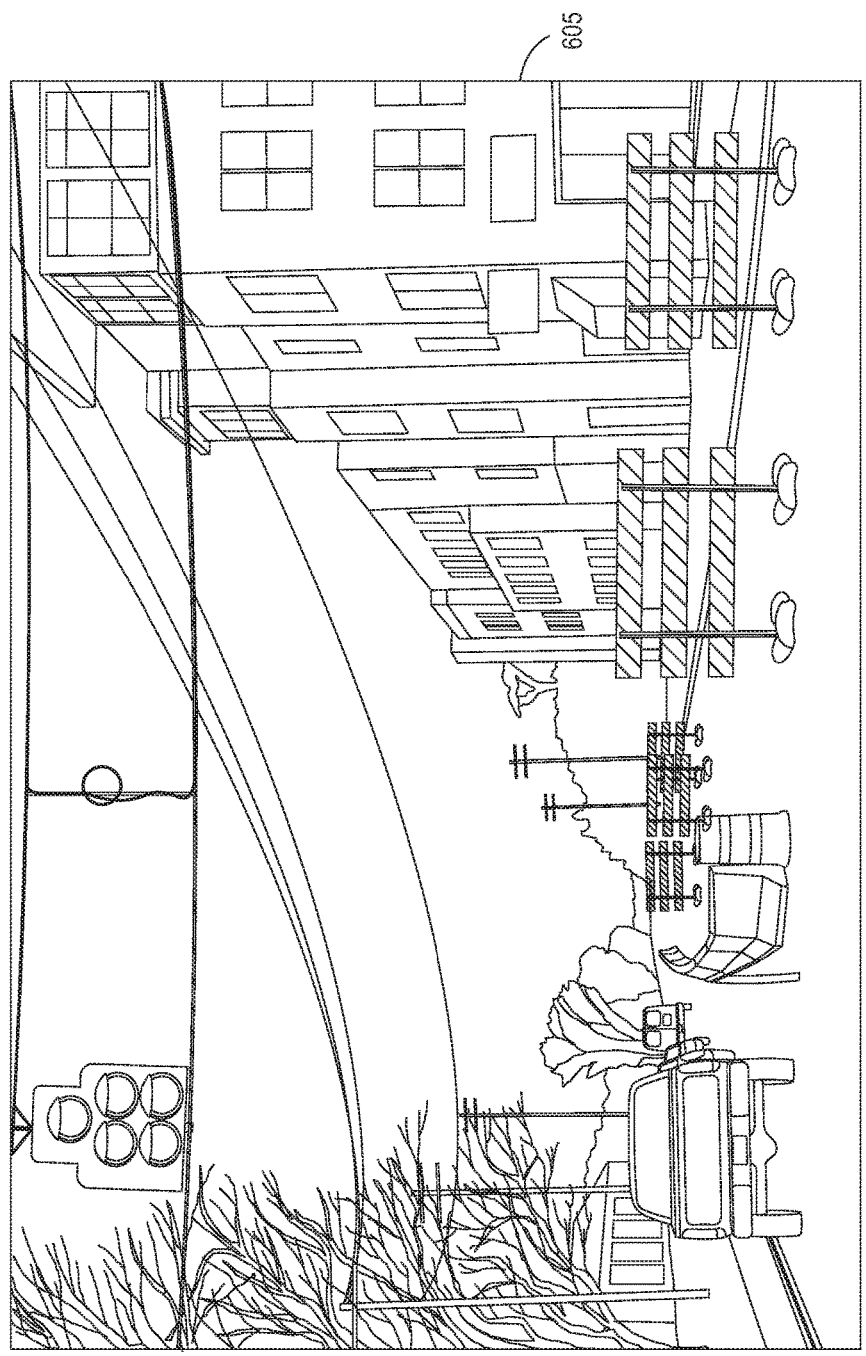
FIG. 6 includes a line drawing representation of an originally captured video frame 605 where processing according to an exemplary embodiment of this disclosure yields a face detection score at zero probability (Low) and a relative fast video playback speed is provided to a manual review process of the redacted video.

FIG. 6 includes a line drawing representation of an originally captured video frame 605 of a scene where processing according to an exemplary embodiment of this disclosure yields a face detection score at zero probability (Low) and a relative fast video playback speed is provided to a manual review process of the redacted video.

Figure 7:
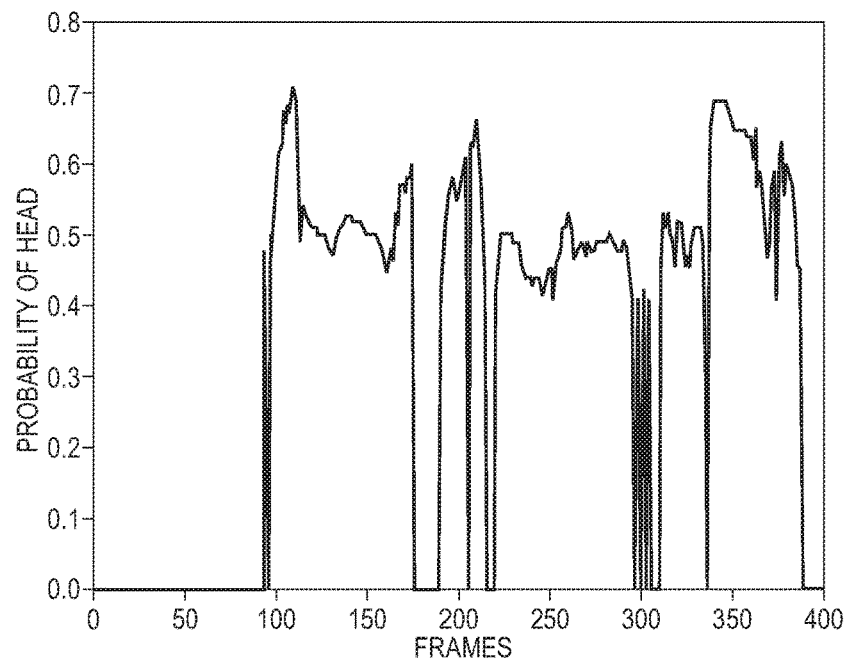
FIG. 7 shows probability curves for head detection in a video sequence of 400 frames according to an exemplary embodiment of this disclosure.
Figure 8:
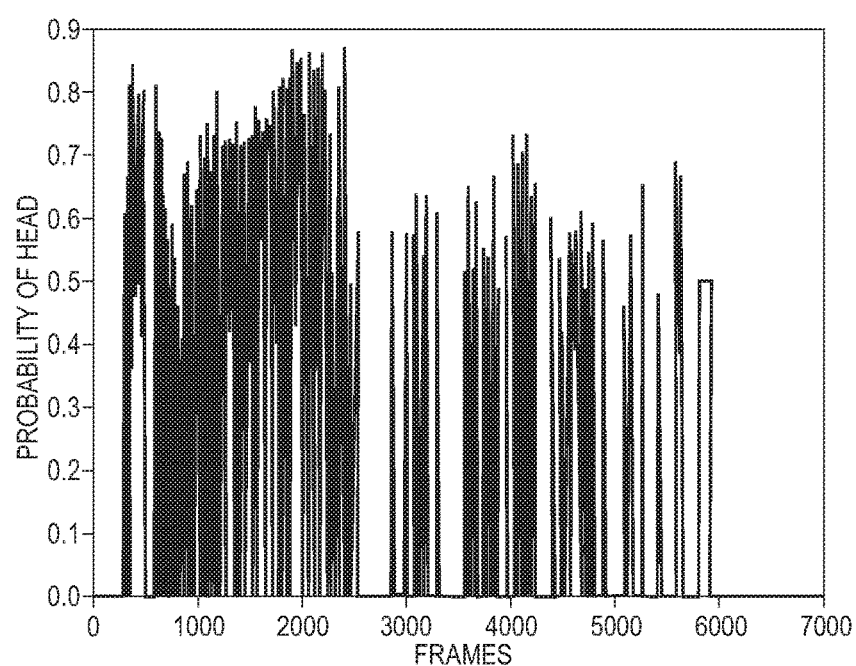
FIG. 8 shows probability curves for head detection in a video sequence of several thousand frames according to an exemplary embodiment of this disclosure.

Examples of probability curves for two sample videos are shown in FIGS. 7 and 8 for head detection. FIG. 7 shows example probability curves for head detection including a surveillance video with 400 frames. The object detector does not find any heads in the first 100 frames which can be played at a higher frame rate during manual review. A longer video collected using a body worn camera has numerous video segments of zero probability and high probability as shown in FIG. 8. The zero probability and high probability video segments will have a higher playback speed during the manual review process.

The frame-rate can also be adjusted based on additional measurements that can be used in conjunction with or as an alternative to the object classifier confidence and probability as described above. Examples of such measurements include the area, size, and/or number of the objects of interest, detected behaviors or actions (e.g., person walking to or away from the camera, fighting, arguing, etc.), scene changes, scene recognition (e.g., crowded scene, traffic scenes, etc.), motion detection, and so on.

EXPERIMENTAL RESULTS

The disclosed method and system of generating a redacted video and augmenting a manual review process was tested on videos from the PEViD dataset (see KORSHUNOV et al., "PEViD: Privacy Evaluation Video Dataset at Applications of Digital Image Processing XXXVI", Proceedings of SPIE. Vol. 8856, 2013) which included 21 surveillance type videos of people performing various tasks like walking, dropping bag, fighting, and stealing in both indoor and outdoor environments. In addition, testing was performed on sample body worn camera video. These video datasets contained a significant number of views of people, so the results shown below are conservative compared to the time savings that can be expected from typical surveillance video.

The probability windows used were [0, 0.1] (highly confident that there are no object(s) of interest present) and [0.7, 1] (highly confident that there the object(s) of interest are present) to determine and provide a fast frame display rate. The original videos acquired were at 30 frames per second (fps). Fast review of the redacted videos was configured to speed up the original video rate by 4 times. For object detection probability windows (0.1, 0.7) indicating a low confidence, the reviewing frame rate was reduced to 20 fps to aid the reviewer in detecting missed object redactions. A deep convolutional-neural-network-based regression model was implemented to detect object bounding boxes. See REDMON et al., "You Only Look Once: Unified, Real-Time Object Detection", CVPR 2016. Because the most common object including identity information is a face, the model was trained to detect human heads. A dataset of 224,740 movie frames with 369,846 annotated human heads was used to train the neural network. See VU et al., "Context-aware CNNs for person head detection", Proceedings of the IEEE International Conference on Computer Vision, 2015.

As discussed above, FIGS. 7 and 8 show examples of the probability curves for head detections for two videos. FIG. 7 curve is from a surveillance video with 400 frames, where the first 100 frames of the video has no activity. This is a common scenario in security videos where long portions of the video do not contain any events or activities, thus such segments of the video can be reviewed very quickly. FIG. 8 curve has numerous segments of very low and high probabilities which have a higher playback speed during the manual review.

Figure 9:
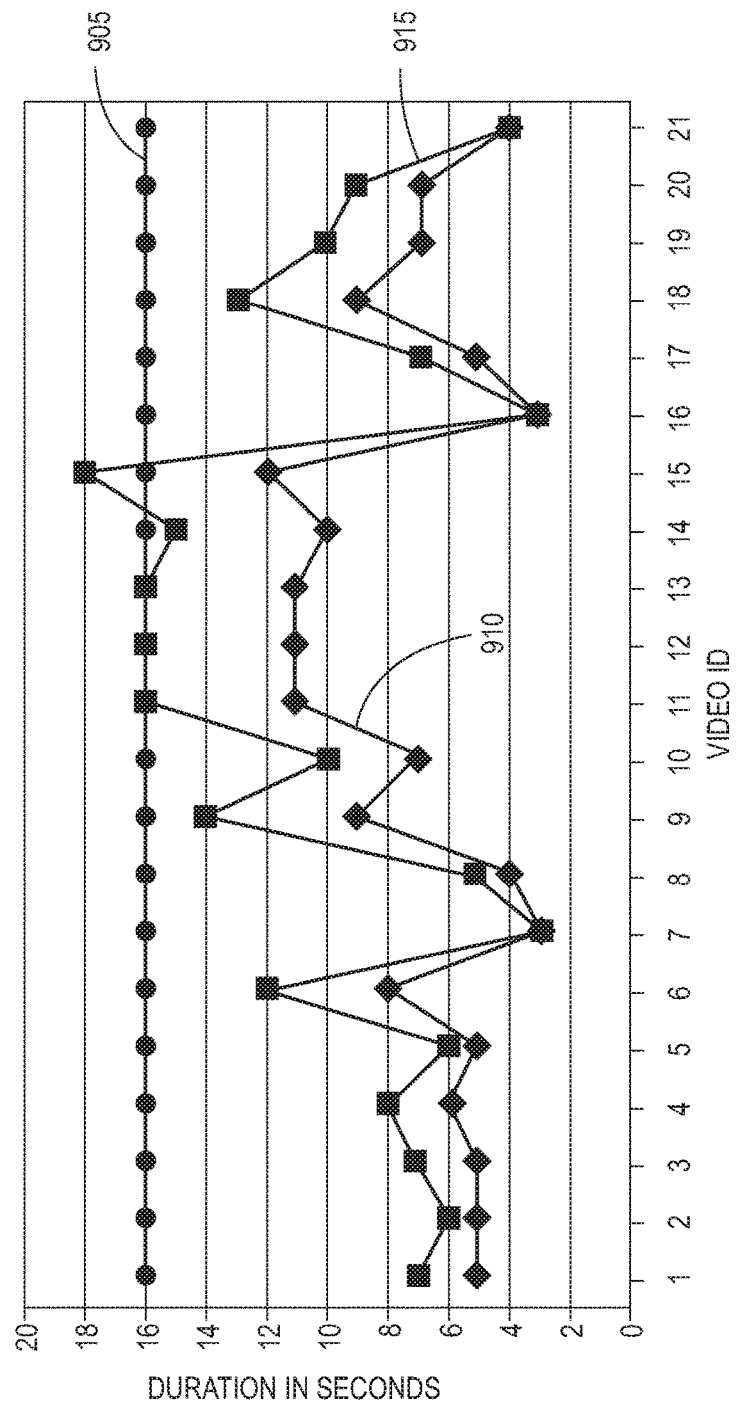
FIG. 9 is a graph showing the relative time duration of a manual review process of redacted video for two cases according to an exemplary embodiment of this disclosure.

FIG. 9 plots the original and expedited playback times for 21 videos of PEViD dataset. Curve 905 indicates the original time duration of each video in seconds; curve 910 indicates the playback time duration for manual review of a redacted video when the playback speed is increased for only irrelevant or confident video segments; and curve 915 indicates the playback time duration for manual review of the redacted video when the playback speed is increased for confident video segments and the playback speed is decreased for less confident video segments requiring careful manual review.

Table 1 below gives the average times over the 21 videos of PEViD dataset, which was reduced from the original time duration of 16 seconds to 7 seconds when only the confident video segments are increased, where the playback time duration was reduced by 44% of the original playback time duration. A time duration of 9.7 seconds was achieved when the less confident segments of the video are decreased to a rate slower than the original frame rate to allow for a more careful manual review of the video, thereby reducing the original playback speed by 61%. There is a trade-off between the review time and the desired accuracy, however in both scenarios the playback time is significantly less than the original time duration of the video which translates to a significant reduction in time for law enforcement to respond to video requests from the public. Similar observations were made with longer body worn camera video.

The disclosed method and system is most efficient with videos including long segments where a detector is very confident, i.e., very low or very high probability.

TABLE 1

| Video ID | Duration (sec) | | |
|---|---|---|---|
| | Original | Speed irrelevant segment only | Speed irrelevant and slow relevant segments |
| Average PEViD | 16 | 7 | 9.76 |
| Body Worn Camera-1 | 201 | 90 | 117 |

Figure 10A:
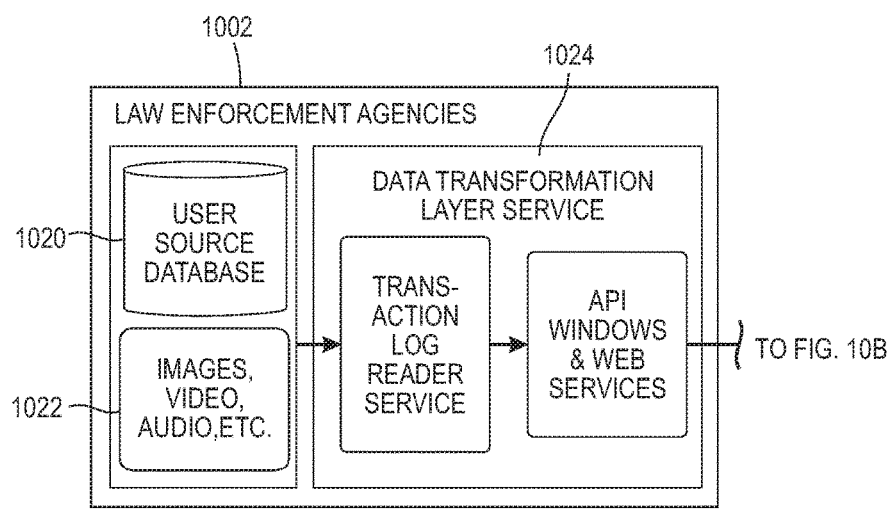
FIGS. 10A and 10B are a system diagram of a Police Evidence Management system including a Video Redaction Module and Augmented Manual Review Process Module according to an exemplary embodiment of this disclosure.
Figure 10B:
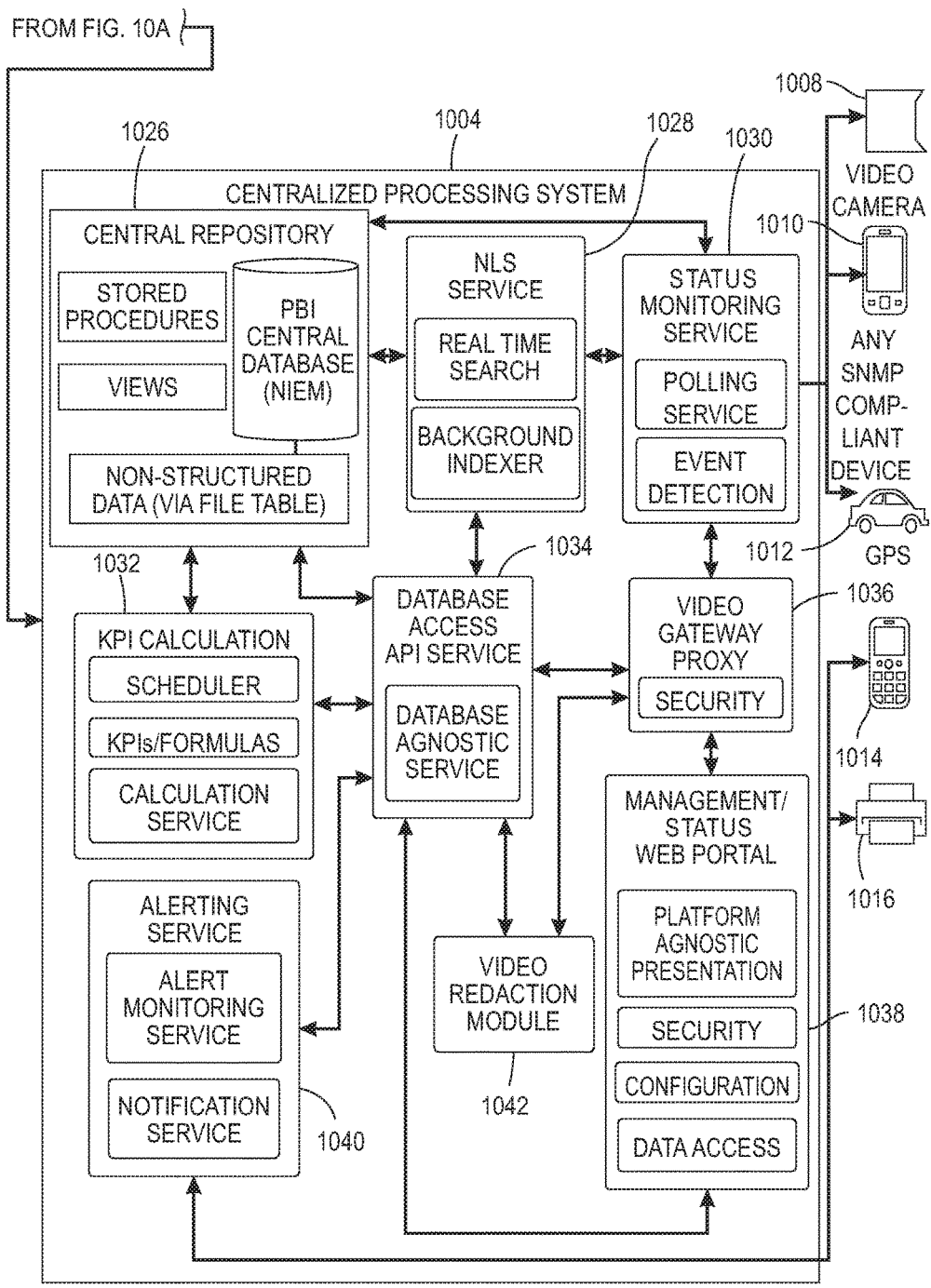

With reference to FIGS. 10A and 10B, provided is a system diagram of a Police Evidence Management system including a Video Redaction System according to an exemplary embodiment of this disclosure. This system is provided to illustrate a manner of incorporating into a central processing system for use with a central public safely and/or law enforcement system a method for automatically generating a redacted video and augmenting a manual review process of the redacted video as described herein.

The Police Evidence Management system includes a Centralized Processing System 1004 which is operatively connected to Law Enforcement Agencies 1002, one or more Video Cameras 1008, SNMP Compliant Devices 1010, Vehicle GPSs 1012, Mobile Communication Devices 1014 and a Printer 1016.

The Central Processing System includes a Central Repository Module 1026, a NLS (National Library Service) Module 1028, KPI (Key Performance Indicator) Calculation Module 1032, A Database Access Module 1034, Alerting Service Module 1040, a Status Monitoring Module 1030, a Video Gateway Proxy Module 1036, a Management/Status Web Portal Module 1038 and a Video Redaction Module 1042 as previously described. The Status Monitoring Module 1030 includes the processing of video acquired from one or more Video Cameras 1008 to detect the occurrence of an event.

The Law Enforcement Agency Module 1002 includes a User Source Database 1020, Images/Video/Audio Database 1022 and Data Transformation Layer Service Module 1024.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of generating a redacted video of a nonredacted video of a scene captured using a video camera and augmenting a manual review process of the redacted video of the scene, the method comprising:
   a) a video acquisition module acquiring the nonredacted video of the scene captured using the video camera, the nonredacted video including a plurality of nonredacted video frames;
   b) an object detection module detecting one or more objects present in one or more of the plurality of nonredacted video frames, each of the detected objects associated with a predetermined object category to be redacted in the generated redacted video and each of the detected objects associated with a respective object detection probability value indicating a probability the detected object belongs to the associated predetermined object category;
   c) a redaction module redacting one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and
   d) a manual review module outputting the redacted video to a user interface for viewing by a user at an adaptively controlled frame rate as a function of the object detection probabilities values associated with the detected one or more objects included in a redacted video frame for manual review.

2. The computer-implemented method according to claim 1, wherein the adaptively controlled frame rate is increased for redacted video frames including only redacted detected objects associated with a high detection probability value defined as a probability value above a predetermined high threshold value.

3. The computer-implemented method according to claim 1, wherein the adaptively controlled frame rate is decreased for redacted video frames including one or more redacted detected objects associated with a mid-level detection probability value defined as a probability value above a predetermined low threshold value and below a predetermined high threshold value.

4. The computer-implemented method according to claim 1, wherein the adaptively controlled frame rate is increased for redacted video frames including only one or more redacted detected objects associated with a low detection probability value defined as a probability below a predetermined low threshold value.

5. The computer-implemented method according to claim 1, wherein the adaptively controlled frame rate is increased for redacted video frames including zero detected objects associated with the predetermined object category to be redacted in the generated redacted video.

6. The computer-implemented method according to claim 1, wherein the adaptively controlled fame rate is calculated as a function of the object detection probability values associated with a plurality of sequential frames of the redacted video, the plurality of sequential frames including the redacted video frame for manual review.

7. The computer-implemented method according to claim 1, wherein the redacted video includes one or more redacted video frames including one or more redacted detected objects, and one or more nonredacted video frames including zero detected objects and/or zero redacted detected objects.

8. The computer-implemented method according to claim 1, wherein the predetermined object category is associated with preserving privacy and includes one or more of a face, a license plate, a tattoo, a house address identifier, a computer screen, a street sign, a logo and a body part.

9. The computer-implemented method according to claim 1, wherein the adaptively controlled frame rate is a function of the object detection probabilities values associated with the detected one or more objects included in the redacted video frame for manual review and the function of one or more of an area of the redacted video frame covered by the detected one or more objects, a size of the detected one or more objects included in the redacted video frame, a number of the one or more objects included in the redacted video frame, an object category of the one or more objects included in the redacted video frame, a motion characteristic of the one or more objects included in the redacted video frame, a scene change detection associated with the redacted video frame and a scene recognition detection associated with the redacted video frame.

10. The computer-implemented method according to claim 1, further comprising:
   an object tracking module tracking the detected one or more objects associated with a predetermined object category across multiple video frames.

11. The computer-implemented method according to claim 10, wherein the object tracking module performs one or more of matching consecutive detections of the detected objects and interpolating between frames including the detection of one or more common detected objects to associate a region of an intermediate frame with the common object.

12. An image processing system for generating a redacted video of a nonredacted scene captured using a video camera and augmenting a manual review process of the redacted video of the scene, the image processing system comprising:
   a video acquisition module acquiring the nonredacted video of the scene captured using the video camera, the nonredacted video including a plurality of nonredacted video frames;
   an object detection module detecting one or more objects present in one or more of the plurality of nonredacted video frames, each of the detected objects associated with a predetermined object category to be redacted in the generated redacted video and each of the detected objects associated with a respective object detection probability value indicating a probability the detected object belongs to the associated predetermined object category;
   a redaction module redacting one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and
   a manual review module outputting the redacted video to a user interface for viewing by a user at an adaptively controlled frame rate as a function of the object detection probabilities values associated with the detected one or more objects included in a redacted video frame for manual review.

13. The image processing system according to claim 12, wherein the adaptively controlled frame rate is increased for redacted video frames including only redacted detected objects associated with a high detection probability value defined as a probability value above a predetermined high threshold value.

14. The image processing system according to claim 12, wherein the adaptively controlled frame rate is decreased for redacted video frames including one or more redacted detected objects associated with a mid-level detection probability value defined as a probability value above a predetermined low threshold value and below a predetermined high threshold value.

15. The image processing system method according to claim 12, wherein the adaptively controlled frame rate is increased for redacted video frames including only one or more redacted detected objects associated with a low detection probability value defined as a probability below a predetermined low threshold value.

16. The image processing system according to claim 12, wherein the adaptively controlled frame rate is increased for redacted video frames including zero detected objects associated with the predetermined object category to be redacted in the generated redacted video.

17. The image processing system according to claim 12, wherein the adaptively controlled fame rate is calculated as a function of the object detection probability values associated with a plurality of sequential frames of the redacted video, the plurality of sequential frames including the redacted video frame for manual review.

18. The image processing system according to claim 12, wherein the redacted video includes one or more redacted video frames including one or more redacted detected objects, and one or more nonredacted video frames including zero detected objects and/or zero redacted detected objects.

19. The image processing system according to claim 12, wherein the predetermined object category is associated with preserving privacy and includes one or more of a face, a license plate, a tattoo, a house address identifier, a computer screen, a street sign, a logo and a body part.

20. The image processing system according to claim 12, wherein the adaptively controlled frame rate is a function of the object detection probabilities values associated with the detected one or more objects included in the redacted video frame for manual review and the function of one or more of an area of the redacted video frame covered by the detected one or more objects, a size of the detected one or more objects included in the redacted video frame, a number of the one or more objects included in the redacted video frame, an object category of the one or more objects included in the redacted video frame, a motion characteristic of the one or more objects included in the redacted video frame, a scene change detection associated with the redacted video frame and a scene recognition detection associated with the redacted video frame.

21. The image processing system according to claim 12, further comprising:
   an object tracking module tracking the detected one or more objects associated with a predetermined object category across multiple video frames.

22. The image processing system according to claim 21, wherein the object tracking module performs one or more of matching consecutive detections of the detected objects and interpolating between frames including the detection of one or more common detected objects to associate a region of an intermediate frame with the common object.

23. An image processing system for generating a redacted video of a nonredacted scene captured using a video camera and augmenting a manual review process of the redacted video of the scene, the image processing system comprising:
   a video acquisition module acquiring the nonredacted video of the scene captured using the video camera, the nonredacted video including a plurality of nonredacted video frames;
   an object detection module detecting one or more objects present in one or more of the plurality of nonredacted video frames, each of the detected objects associated with a predetermined object category to be redacted in the generated redacted video;
   a redaction module redacting one or more of the detected one or more objects associated with the predetermined object categories by performing one or more of obfuscating the detected object and removing the detected object, and the redaction module generating the redacted video, the redacted video including, at least in part, one or more redacted video frames including one or more redacted detected objects; and a manual review module outputting the redacted video to a user interface for viewing by a user at an adaptively controlled frame rate as a function of one or more of an area of the redacted video frame covered by the detected one or more objects, a size of the detected one or more objects included in the redacted video frame, a number of the one or more objects included in the redacted video frame, an object category of the one or more objects included in the redacted video frame, a motion characteristic of the one or more objects included in the redacted video frame, a scene change detection associated with the redacted video frame and a scene recognition detection associated with the redacted video frame.

24. The image processing system according to claim 23, wherein the predetermined object category is associated with preserving privacy and includes one or more of a face, a license plate, a tattoo, a house address identifier, a computer screen, a street sign, a logo and a body part.

25. The image processing system according to claim 23, further comprising:
   an object tracking module tracking the detected one or more objects associated with a predetermined object category across multiple video frames.

26. The image processing system according to claim 25, wherein the object tracking module performs one or more of matching consecutive detections of the detected objects and interpolating between frames including the detection of one or more common detected objects to associate a region of an intermediate frame with the common object.

* * * * *